Nov. 21, 1933.    F. H. OWENS    1,936,205
ROLLER SUPPORT FOR SOUND RECORD FILMS
Filed Nov. 6, 1929
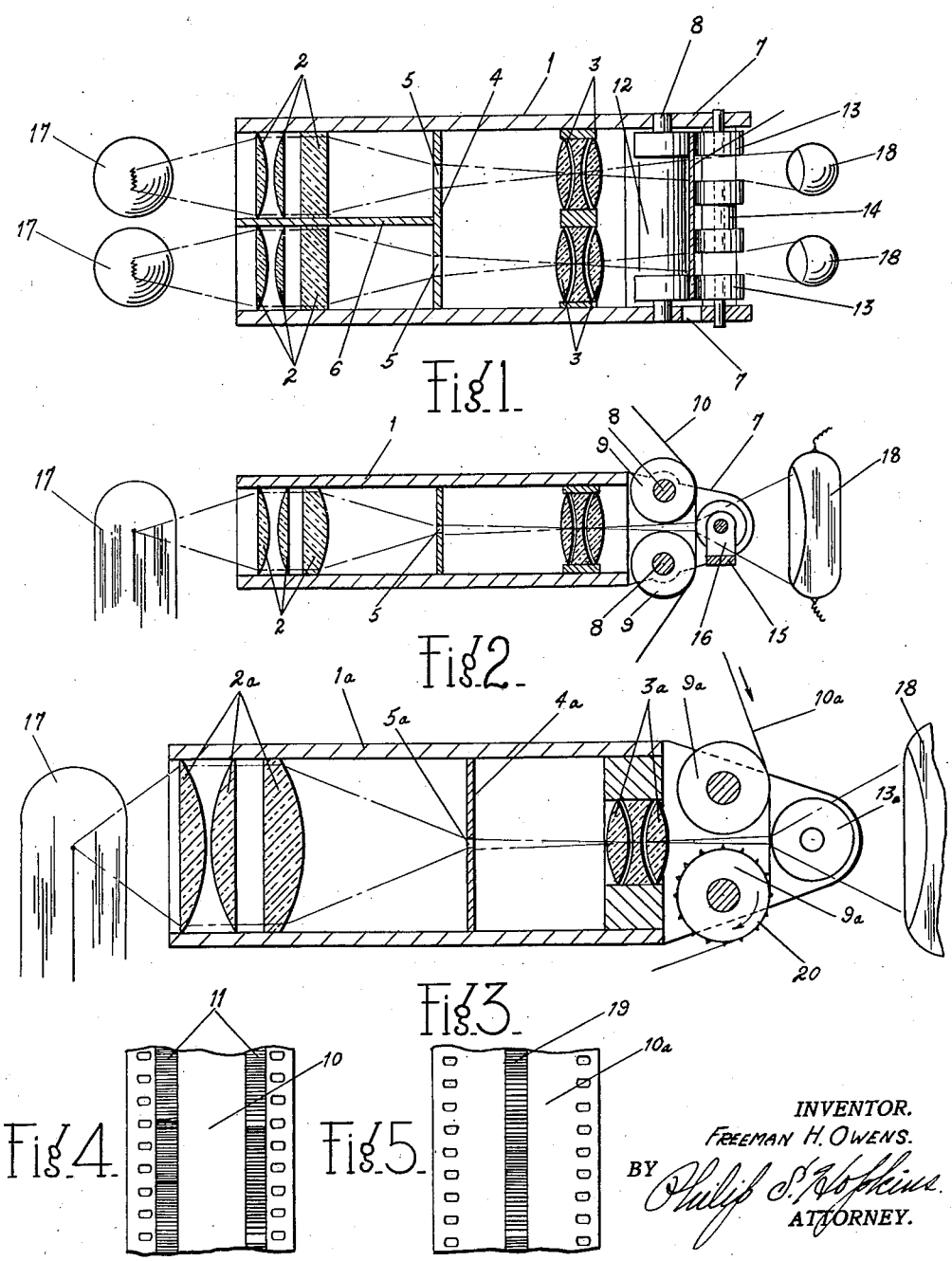
INVENTOR.
FREEMAN H. OWENS.
BY Philip S. Hopkins
ATTORNEY.

Patented Nov. 21, 1933

1,936,205

UNITED STATES PATENT OFFICE 1,936,205

ROLLER SUPPORT FOR SOUND RECORD FILMS

Freeman H. Owens, New York, N. Y.

Application November 6, 1929. Serial No. 405,232

4 Claims. (Cl. 274—5)

This invention relates to improvements in roller supports for sound record films, the principal object of the invention being to provide a device of this character adapted for use in connection with sound reproducing and recording apparatus, by means of which device a film carrying a photographic sound record or a plurality of such records or a film on which such records are to be made may be supported in absolutely flat condition during its passage past the light station.

Other objects and advantages will appear as the description proceeds.

In the drawing accompanying this specification,

Figure 1 is a sectional plan view of a dual optical system such as may be used in a sound reproducing apparatus, showing the present invention applied thereto;

Figure 2 is a sectional side view of the apparatus shown in Figure 1;

Figure 3 is a sectional side view of a single optical system showing a modification of the invention applied thereto;

Figure 4 is a plan view of a portion of a film carrying two sound records adapted for use with the apparatus shown in Figures 1 and 2; and Figure 5 is a plan view of a portion of a single record film adapted for use with the apparatus shown in Figure 3.

Figures 1 and 2 of the drawing illustrate the invention applied to a dual system, that is to say, a system involving reproduction of two sound records carried by a single film. In these figures 1 designates a housing in which is mounted a dual optical system, comprising a pair of condenser lens units 2 and a pair of focusing lens units 3, the condenser and focusing lenses of each unit being disposed in alignment and having between them a partition 4 in which is formed a slit 5 for each unit, said slits being in the path of projection between the condenser lens and the focusing lens. That portion of the housing in which the condenser lenses are disposed is divided by an axially extending partition 6 so as to form separate chambers for the individual condenser lenses.

The side walls of the housing 1, at that end thereof opposite from the condenser lenses, extend beyond the housing proper to form brackets 7 in which are journaled the shafts 8 of a pair of rollers 9, in position to support a traveling film 10 carrying a pair of sound records 11 in the paths of projection of the respective optical systems. The rollers 9 are so formed at their peripheries that is with the intermediate portion of both rollers being cut away as shown at 12 whereby the rollers are spaced apart throughout the greater portion of their length to provide an exposure opening through which light may pass from the respective focusing lenses to the sound records carried by the film 10. In order to maintain the film in perfectly flat condition at this point, which is the light station or point of translation, short independent rollers 13 are mounted for rotation in alignment with each other on studs secured in the brackets 7 at that side of the film opposite from the rollers 9, said independent rollers being adapted to engage the film at those portions thereof which span or bridge the space between the end portions of the rollers 9. A third independent roller 14 is mounted for rotation between and in alignment with the rollers 13, but is spaced from both of said rollers thereby to permit the passage of light between the ends of said roller 14 and both of its companion rollers 13. A convenient means of supporting the roller 14 is to provide a cross member 15 extending from one bracket 7 to the other, said cross member being provided with upstanding brackets 16 perforated to receive the shaft of the roller.

In alignment with the condenser lenses at one end of the apparatus are a pair of lamps 17, and in alignment with the spaces between the rollers 13 and 14 at the opposite end are disposed a pair of photo electric cells 18, the outputs of which may be connected with suitable amplifiers and loud speakers in the usual manner.

The device shown in Figure 3 is adapted for reproduction of a single sound record, as for instance the record 19 carried by the film 10a. In this form of the device, the condenser lens 2a and focusing lens 3a are disposed in axial alignment centrally of the housing 1a which is provided with a partition 4a between said condenser and focusing lenses, said partition having the usual slit 5a the aerial image of which is projected by the condenser lens on the focusing lens. The roller 9a and independent rollers 13a are of the same form as the corresponding rollers described in connection with Figures 1 and 2. In the single record apparatus shown in Figure 3, however, the intermediate independent roller is omitted so as to leave an unobstructed passageway for the light passing from the film to the photo electric cell. In Figure 3 one of the rollers 9a is provided with a sprocket 20 which may be used to pull the film past the light station.

In both forms of the apparatus above described, it will be obvious that, owing to the peculiar arrangement of the rollers the film is supported in absolutely flat condition, during its passage past the light station, since because of the staggered relation of the rollers at one side of the film with those at the opposite side thereof the film will be positively prevented from curling, buckling or wrinkling either transversely or longitudinally at this point.

It will, of course, be understood that while I have shown the invention herein applied to a reproducing apparatus, it is equally applicable for use in a recording apparatus, and the invention is not to be limited in this respect, nor is it to be limited to the exact details of construction herein described as I am aware that many mechanical modifications may be made therein without departing from the spirit and scope of the invention as set forth in the claims hereto appended.

I claim:

1. A roller support for sound record films, comprising a pair of rollers mounted for rotation in parallel relation and spaced apart throughout the greater portion of their length for the passage of light between said rollers to a film during the passage of the film from one roller to the other said rollers supporting said film, and rollers mounted for rotation in parallel staggered relation to said pair of rollers and adapted to engage the film on the side thereof away from said pair of rollers, said last named rollers guiding said film in a straight path past said light passage.

2. A roller support for sound record films, comprising a pair of rollers mounted for rotation in parallel relation and spaced apart throughout the greater portion of their length for the passage of light between said rollers to a film during the passage of the film from one roller to the other, and a plurality of rollers mounted for rotation in axial alignment and spaced apart from each other, said last rollers being disposed in parallel staggered relation with said pair of rollers and adapted to engage the film on the side thereof away from said pair of rollers, said last named rollers guiding said film in a straight path past said light passage.

3. The combination with a dual optical system having a pair of focusing lenses, of a pair of rollers mounted for rotation in parallel relation with each other across the path of projection of said lenses and adapted to support a traveling film, said rollers being spaced apart for the passage of light from both of said lenses to said film, and axially aligned rollers in contact with the film at the side thereof opposite from said rollers for retaining the film in flat condition between the first mentioned rollers.

4. The combination with a dual optical system having a pair of focusing lenses, a light sensitive element disposed in alignment with each of said lenses, of a pair of rollers mounted for rotation in parallel relation with each other on opposite sides of the path of projection of said lenses and adapted to support a traveling film between said lenses and their companion light sensitive elements, said rollers being spaced apart for the passage of light from both of said lenses to said film, and a plurality of rollers mounted for rotation in parallel staggered relation to said pair of rollers and adapted to engage the film on the side thereof opposite from said pair of rollers, said second named rollers being in axial alignment and spaced apart from each other thereby to permit passage of light from the film to both of said light sensitive elements.

FREEMAN H. OWENS.